US012326058B2

(12) United States Patent
Kleiven

(10) Patent No.: US 12,326,058 B2
(45) Date of Patent: Jun. 10, 2025

(54) WIPER TOOL

(71) Applicant: John Gjerde AS, Gjerdsvika (NO)

(72) Inventor: Bjørnar Kleiven, Ulsteinvik (NO)

(73) Assignee: John Gjerde AS, Gjerdsvika (NO)

( * ) Notice: Subject to any disclaimer, the term of this patent is extended or adjusted under 35 U.S.C. 154(b) by 0 days.

(21) Appl. No.: 18/722,540

(22) PCT Filed: Dec. 20, 2022

(86) PCT No.: PCT/NO2022/050319
§ 371 (c)(1),
(2) Date: Jun. 20, 2024

(87) PCT Pub. No.: WO2023/121474
PCT Pub. Date: Jun. 29, 2023

(65) Prior Publication Data

US 2025/0146377 A1 May 8, 2025

(30) Foreign Application Priority Data

Dec. 21, 2021 (NO) .................................. 20211567

(51) Int. Cl.
*E21B 33/08* (2006.01)
*B08B 1/14* (2024.01)
(Continued)

(52) U.S. Cl.
CPC .............. *E21B 33/08* (2013.01); *B08B 1/143* (2024.01); *B08B 1/20* (2024.01); *B08B 1/40* (2024.01); *B08B 13/00* (2013.01); *B08B 2240/00* (2013.01)

(58) Field of Classification Search
CPC ................................ E21B 21/01; E21B 33/08
See application file for complete search history.

(56) References Cited

U.S. PATENT DOCUMENTS 2,821,730 A * 2/1958 Shellman ................ E21B 33/08 254/389
3,265,399 A * 8/1966 Scaramucci ............ E21B 33/08 277/330

(Continued)

FOREIGN PATENT DOCUMENTS

CN 203756125 U 8/2014
CN 205422650 U 8/2016

(Continued)

OTHER PUBLICATIONS

International Preliminary Report on Patentability received in International Application No. PCT/NO2022/050319, dated Mar. 27, 2024, in 15 pages.

(Continued)

*Primary Examiner* — Shane Bomar
(74) *Attorney, Agent, or Firm* — KNOBBE, MARTENS, OLSON & BEAR, LLP

(57) ABSTRACT

A tool (1) comprises a body (40) having a through-going opening (9) and one or more elongate flexible elements (12, 22). The tool comprises a movable element (30) with an associated drive unit (6) and at least one control unit (11, 21). The elongate flexible elements (12, 22) are connected at one end to the movable element (30) and at another end to a control unit (11, 21), and the movable element is configured to extend at least a portion of at least one of the elongate flexible elements into the opening (9). The movable element (30) may be a ring gear drivingly connected to the drive unit, and the connection members (13, 23) are preferably connected to the ring gear at diametrically opposite sides. The tool may be used as a wiper tool for wiping substances from the outer wall of a tubular element or a rod element, such as a drill pipe (3).

13 Claims, 15 Drawing Sheets

(51) Int. Cl.

| | |
|---|---|
| ***B08B 1/20*** | (2024.01) |
| ***B08B 1/40*** | (2024.01) |
| ***B08B 13/00*** | (2006.01) |

(56) References Cited

U.S. PATENT DOCUMENTS

| | | | | |
|---|---|---|---|---|
| 3,733,641 | A | 5/1973 | Brown | |
| 4,108,258 | A | 8/1978 | Ekwall | |
| 4,938,290 | A * | 7/1990 | Leggett | E21B 33/062 166/387 |
| 5,097,595 | A * | 3/1992 | Suggs | F16J 15/186 29/451 |
| 6,059,052 | A * | 5/2000 | Haggard | E21B 33/08 175/84 |
| 9,453,392 | B1 * | 9/2016 | Marchiori | E21B 21/01 |
| 9,784,065 | B2 * | 10/2017 | Holtby | E21B 33/00 |
| 10,260,306 | B1 * | 4/2019 | Beckett | E21B 33/124 |
| 2010/0226724 | A1 * | 9/2010 | Doleshal | E02B 17/0034 405/211 |
| 2015/0152699 | A1 | 6/2015 | Angelle et al. | |
| 2015/0275625 | A1 | 10/2015 | Machicek | |
| 2015/0285949 | A1 * | 10/2015 | Macquin | G01V 13/00 134/6 |
| 2023/0323736 | A1 | 10/2023 | Krogh | |

FOREIGN PATENT DOCUMENTS

| | | | |
|---|---|---|---|
| CN | 209100012 | U | 7/2019 |
| CN | 111648724 | A | 9/2020 |
| CN | 213205566 | U | 5/2021 |
| CN | 113513272 | A | 10/2021 |
| CN | 217652707 | U | 10/2022 |
| JP | S54136761 | U | 9/1979 |

OTHER PUBLICATIONS

International Search Report received in International Application No. PCT/NO2022/050319, mailed Feb. 3, 2023.

Norwegian Search Report received in Norwegian Application No. NO 20211567, dated Jun. 24, 2022, in 2 pages.

* cited by examiner

WIPER TOOL

TECHNICAL FIELD OF THE INVENTION

The present invention relates to wiper systems, and more particularly to an apparatus for removing liquids and/or debris from a cylindrical member, such as a drill pipe.

BACKGROUND OF THE INVENTION

When drilling into subterranean formations, for example into a hydrocarbon reservoir, the drill cuttings produced by the drill bit are carried to the earth's surface by circulating drilling fluids. Drilling fluids, also referred to as drilling mud, are also used to control the wellfluids (e.g. oil, gas, water). The drilling fluids are continuously pumped down into the well bore through the drill pipe and the drill bit are recirculated to the surface. When the drill pipe is being removed from the wellbore (referred to as "tripping out"), the drill pipe outer surface is often covered by liquids and debris, such as drilling fluids and cuttings. These substances need to be removed before drill pipe sections are placed in storage. The substances are harmful to the environment, and therefore need to be collected for safe storage treatment.

Several systems and devices for wiping the exterior surface of a pipe exist. For example, US 2015/0275625 A1 discloses a hand-held clamp-on wiper that facilitates the cleaning of external surfaces of sections of a drill string or drill pipe to remove earth, drilling mud, and other solid/liquid compounds while the drill string is being handled on a drilling platform. The pipe wiper includes a split cylinder with two halves hinged together, each with a handle. Internal to each half cylinder are a number of half circle flexible squeegees that conform to the outside diameter of the drill string when the device is closed. The device may be handled by an individual and positioned around the pipe, and the user may close and hold the pipe wiper around the pipe while the drill string is moving upward so as to wipe liquid and solid debris from the pipe as it is raised.

One disadvantage of the prior art devices is that they are hand-held and manually operated, and therefore require human presence on the drill floor, very close to the drill pipe. Current HSE (Health, Safety, Environment) standards stipulate the human presence on the drill floor should be kept to a minimum. One objective of the present invention is therefore to present a device which may be remotely operated.

SUMMARY OF THE INVENTION

The invention is set forth and characterized in the main claim, while the dependent claims describe other characteristics of the invention.

It is thus provided a tool comprising a body having a through-going opening and one or more elongate flexible elements, characterized by:

a movable element with an associated drive unit, at least one control unit;

wherein each of the elongate flexible elements is connected at a respective one end to the movable element and at another end to a control unit; and wherein the movable element is configured to extend at least a portion of at least one of the elongate flexible elements into the opening.

In one embodiment, the tool comprises at least a pair of elongate flexible elements, and each elongate flexible element is connected to the movable element via respective connection members that are arranged at opposite sides of the opening. The movable element may be a ring gear drivingly connected to the drive unit, and the connection members are preferably connected to the ring gear at diametrically opposite sides.

In one embodiment, the tool comprises compartments configured for housing respective elongate flexible elements. In one embodiment, the connection members are arranged at different and parallel horizontal planes. The ring gear may be configured to rotate at least 180°.

In one embodiment, the drive unit and the at least one control unit are operable to control the deployment and retraction of the respective elongate flexible element, and the interplay between the drive unit and the control units is controllable, either manually or based on sensed parameters such as tension in the elongate flexible member.

In one embodiment, the tool comprises a plurality of external nozzles configured and arranged for spraying a fluid onto at least a portion of the elongate flexible elements, the external nozzles being arranged between the through-going opening and a control unit.

In one embodiment, the tool comprises a plurality of internal nozzles configured and arranged for spraying a fluid into the through-going opening.

The tool according to the invention may be used as a wiper tool for wiping substances from the outer wall of a tubular element or a rod element, such as a drill pipe.

It is also provided a drilling facility, comprising at least a deck and devices for handling a drill pipe or a similar tubular, characterized by at least one tool according to the invention. The tool is one embodiment connected to a deck and is arranged such that the through-going opening is aligned with a deck opening for the drill pipe. In one embodiment, the tool is connected to a deck which is below a drilling deck, and a collection system is fluidly connected to the tool and configured to collect substances wiped from the drill pipe by the elongate flexible elements.

BRIEF DESCRIPTION OF THE DRAWINGS

These and other characteristics of the invention will become clear from the following description of embodiments of the invention, given as non-restrictive examples, with reference to the attached schematic drawings, wherein.

DETAILED DESCRIPTION OF EMBODIMENTS OF THE INVENTION

Figure 1:
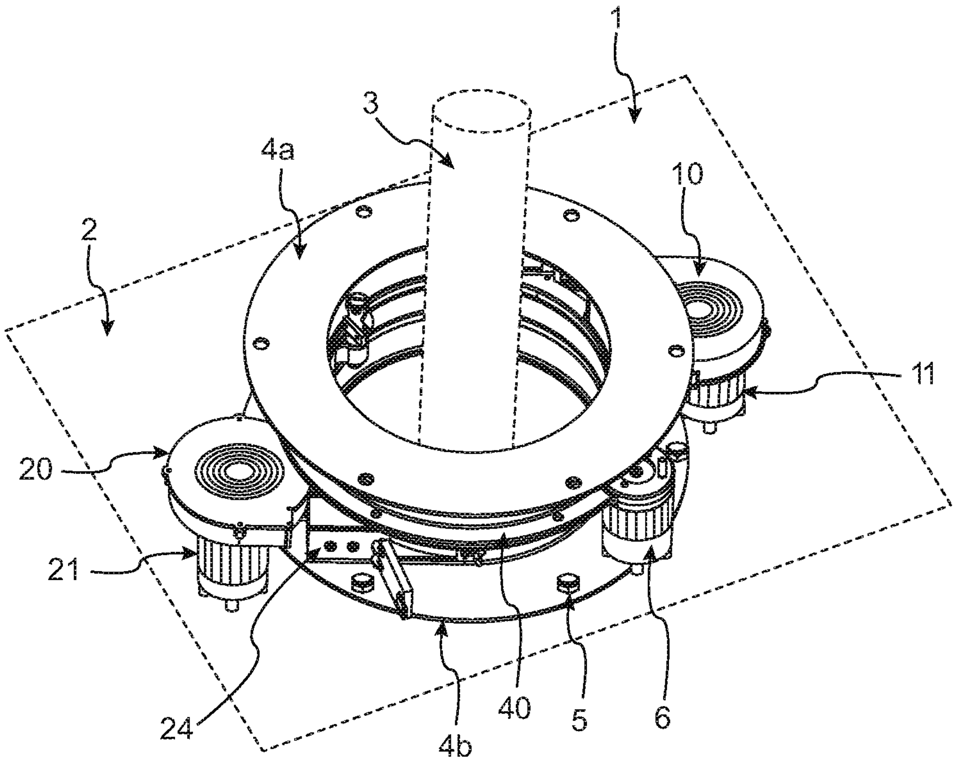
FIG. 1 is a perspective view of a first embodiment of the tool according to the invention, in an unactivated state.

The following description may use terms such as “horizontal”, “vertical”, “lateral”, “back and forth”, “up and down”, “upper”, “lower”, “inner”, “outer”, “forward”, “rear”, etc. These terms generally refer to the views and orientations as shown in the drawings and that are associated with a normal use of the invention. The terms are used for the reader’s convenience only and shall not be limiting.

Figure 2:
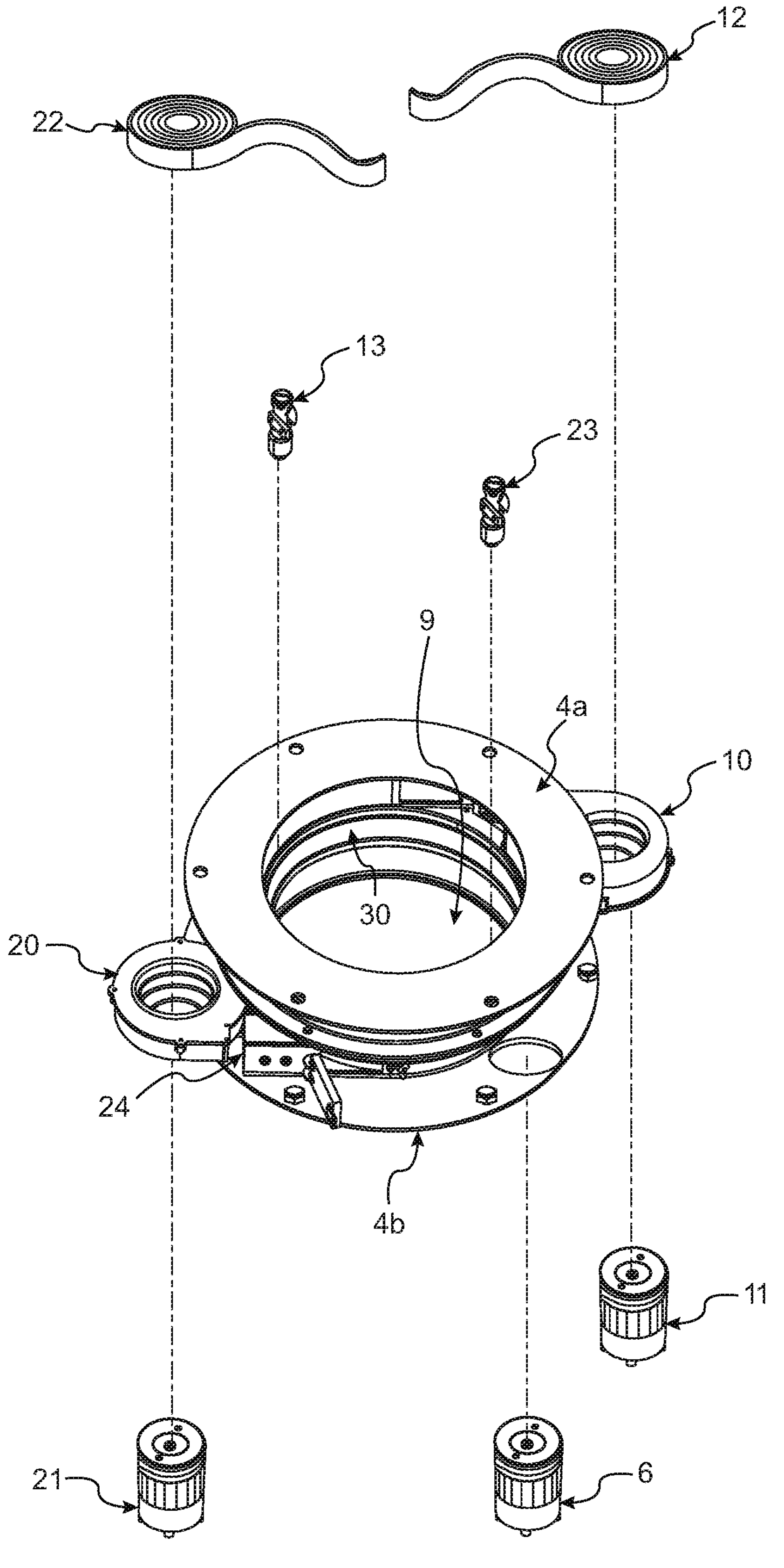
FIG. 2 is a partly exploded view of the tool illustrated in FIG. 1.

Referring initially to FIGS. 1 and 2, the tool 1 according to the invention comprises a housing having a main body 40, upper and lower covers 4*a,b*, and a through-going opening 9. In the illustrated embodiment, the tool is secured to a foundation 2, such as a deck of a drilling rig, by means of bolts 5. It should be understood, however, that the tool 1 may be placed on other types of support structures and utilize other fastening means. A rod-shaped or tubular element 3 extends through the opening 9. The element 3 may for example be a drill pipe or a drill string. Also seen in FIGS. 1 and 2 are first and second compartments 10, 20, first and second control units 11, 21, and a drive unit 6. The control units 11, 21 and the drive unit 6 comprise drive devices (e.g. hydraulically or electrically powered motors) and are powered and controlled in a manner known in the art. Control cables, power cables, hydraulic lines, and other devices required to operate the tool are not illustrated, as such devices are well known in the art.

Each compartment 10, 20 comprises a respective elongate flexible member 12, 22, stored inside the compartment, for example in a coiled configuration as shown in FIG. 2. Other storage configurations are conceivable. The elongate flexible member 12, 22 may be a band or belt, and may be elastic or non-elastic in the longitudinal direction. The band or belt may be reinforced in a manner known in the art, e.g. by embedded fibers, and may comprise a weak-link. One end of each elongate flexible member 12, 22 is connected to the respective first and second control units 11, 21, for example via a spindle (not shown). The other end of each elongate flexible member 12, 22 is connected to a movable element 30 via respective connection members 13, 23. The movable element 30, connection members, and housing are preferably made from a steel material. It should be understood that the connection members may have other shapes and features than the ones illustrated, as long as they fulfil the function of connecting the elongate flexible member to the movable element 30.

Figure 3:
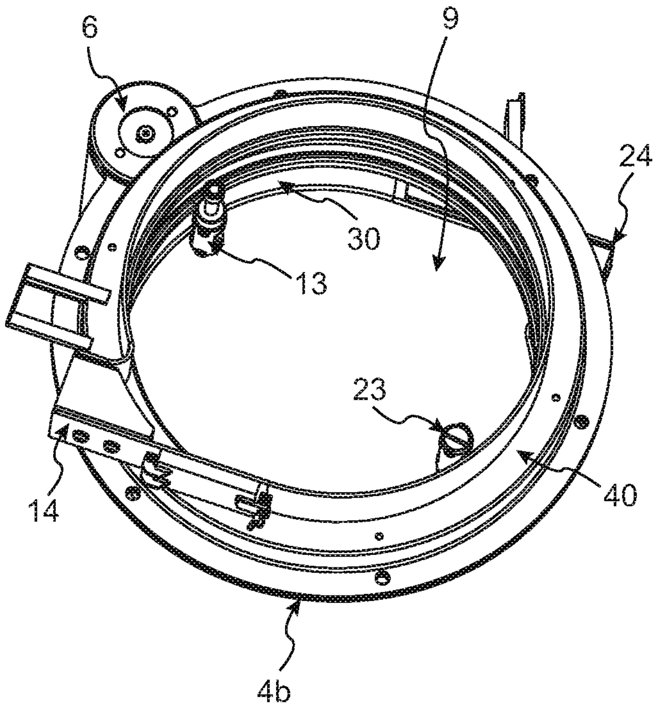
FIG. 3 is a perspective view of the tool illustrated in FIG. 1, in an unactivated state, but from a different perspective and with certain elements removed in order to illustrate internal components.

The movable element 30 and the connection members 13, 23 are shown in FIG. 3. Reference numbers 14, 24 designate channels with openings through which respective elongate flexible members 12, 22 (not shown in FIG. 3) may be extended into the main body 40 (for connection to respective connection members 13, 23). As shown in FIG. 2, each compartment 10, 20 is arranged adjacent to its respective channel 14, 24.

Figure 4:
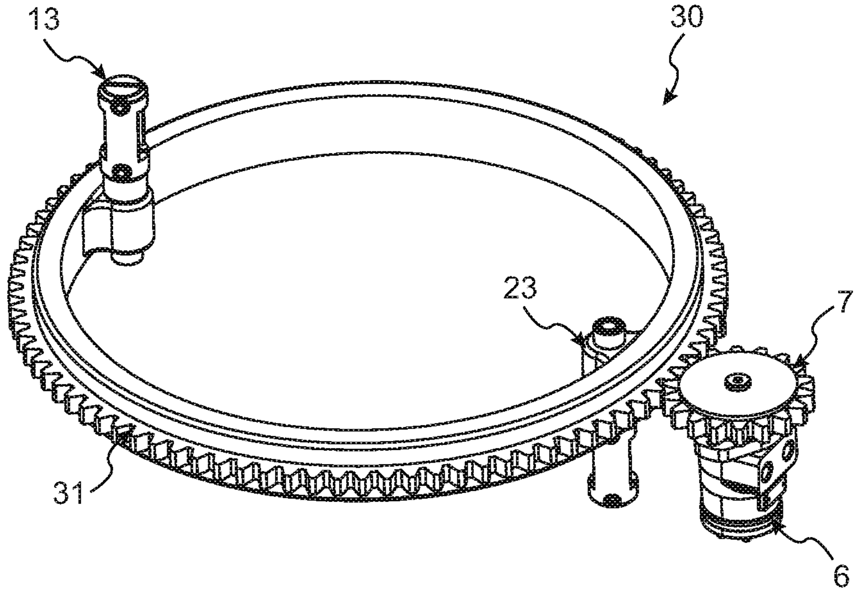
FIG. 4 is a perspective view of a movable element in the form of a ring gear, and its associated drive unit.

FIG. 4 illustrates an embodiment of the movable element 30 as a ring gear 30 with external gear teeth 31. The drive unit 6 is rotatably connected to the movable element 30 via teeth on a driving gear 7 (driven by the drive unit 6) that mesh with the teeth 31. Rotation of the driving gear 7 will thus cause rotation of the movable element 30, and vice versa. It should be understood that other types of gears are conceivable, as are other types of drive means, as long as they achieve the function of moving the connecting member 13, 23 in the same or parallel planes. Also apparent from FIG. 4 is that the connection members 13, 23 are connected to the movable element (ring gear) 30 at diametrically opposite positions, such that the two arc lengths between the connection members are equal. Although not illustrated, additional connection members are conceivable, for example dividing the arc lengths into four equal segments.

Figure 5:
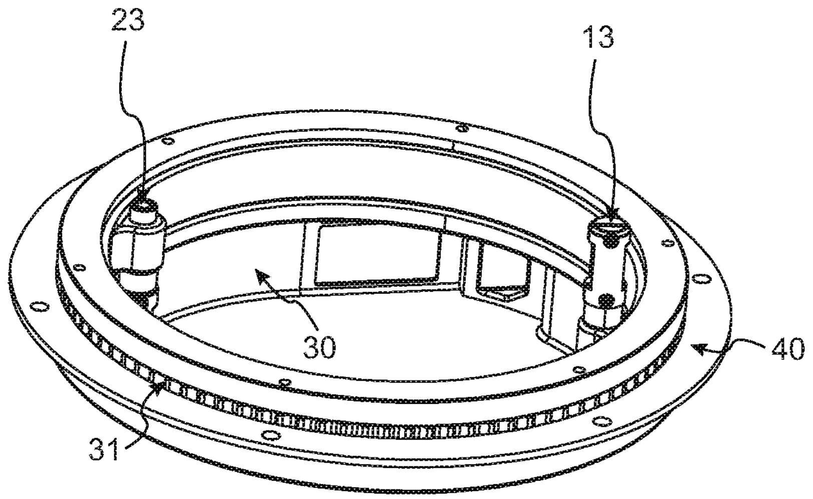
FIG. 5 is a perspective view of an inner housing of the tool according to the invention, with certain parts removed to disclose the ring gear.

FIGS. 4 and 5 also illustrate how the first connection member 13 extends upwards from the movable element 30 and the second connection member 23 extends downwards from the movable element 30. This corresponds to the arrangement of the compartments 10, 20 (see e.g. FIGS. 1 and 2), where the first compartment 10 is arranged above the second compartment 20.

Figure 6:
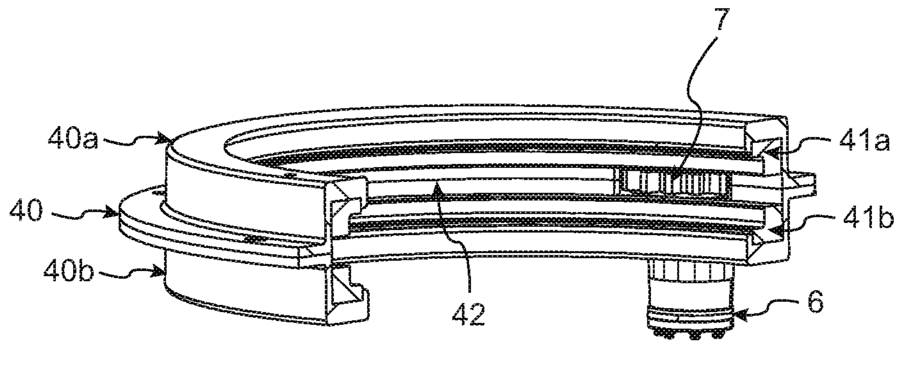
FIG. 6 is a perspective sectional view of a part of the main body, without the ring gear.
Figure 7:
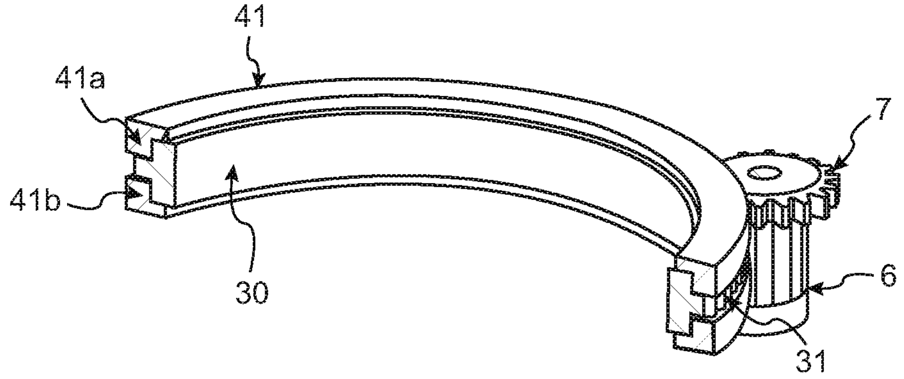
FIG. 7 is a perspective sectional view of a part of an insert and a part of the ring gear, and the associated drive unit.

FIG. 6 is a perspective sectional view of a part of the main body 40. The main body may comprise two body halves 40*a*, 40*b* that are firmly connected (e.g. bolted or welded). Inside the main body is a circular insert 41 which may comprise two halves 41*a*, 41*b* thus forming a groove 42 in the circular insert 41. The circular insert 41 is fixed to the main body in a manner known in the art. FIG. 7 is a perspective sectional view the insert 41 and a part of the movable element 30 (here: a ring gear), and the associated drive unit 6; The insert 41 is preferably made of a material having a low friction coefficient, and may comprise other friction-reducing means or devices. Operation of the drive unit 6 will thus cause movement of the ring gear 30 relative to the insert 41.

From the above description, it will be understood that actuating the drive unit 6 to move (rotate) the ring gear 30 in one direction will cause the elongate flexible members 12, 22 (e.g. bands or belts) to be pulled a distance out from their respective compartments 10, 20. During this tool activation operation, the first and second control units 11, 21 are either not engaged or they are engaged to provide a desired amount of back-tension in the elongate flexible members, in order to maintain the elongate flexible members taut. Conversely, in a tool deactivation operation, the first and second control units 11, 21 are operated to pull (e.g. wind) the respective flexible members 12, 22 into their respective compartments. The control units may comprise or be assisted by springs or other automatic retraction devices. During this operation, the drive unit 6 is either not engaged or it is engaged to provide a desired amount of back-tension in the elongate flexible members, in order to maintain the elongate flexible members taut. In either operation, the interplay between the drive unit 6 and the control units 11, 21 may be controlled manually or based on sensed parameters, such as tension in the flexible members.

Figure 8:
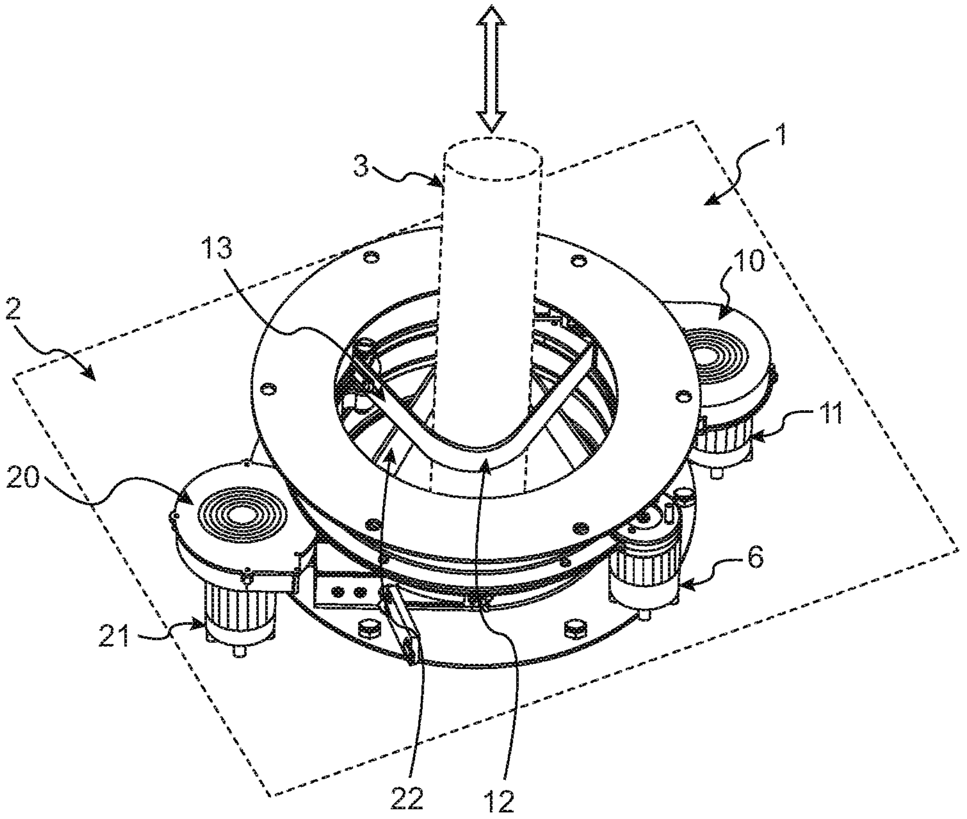
FIG. 8 corresponds to FIG. 1, and illustrates the tool according to the invention, in an activated state engaging a rod or a tubular element.
Figure 9:
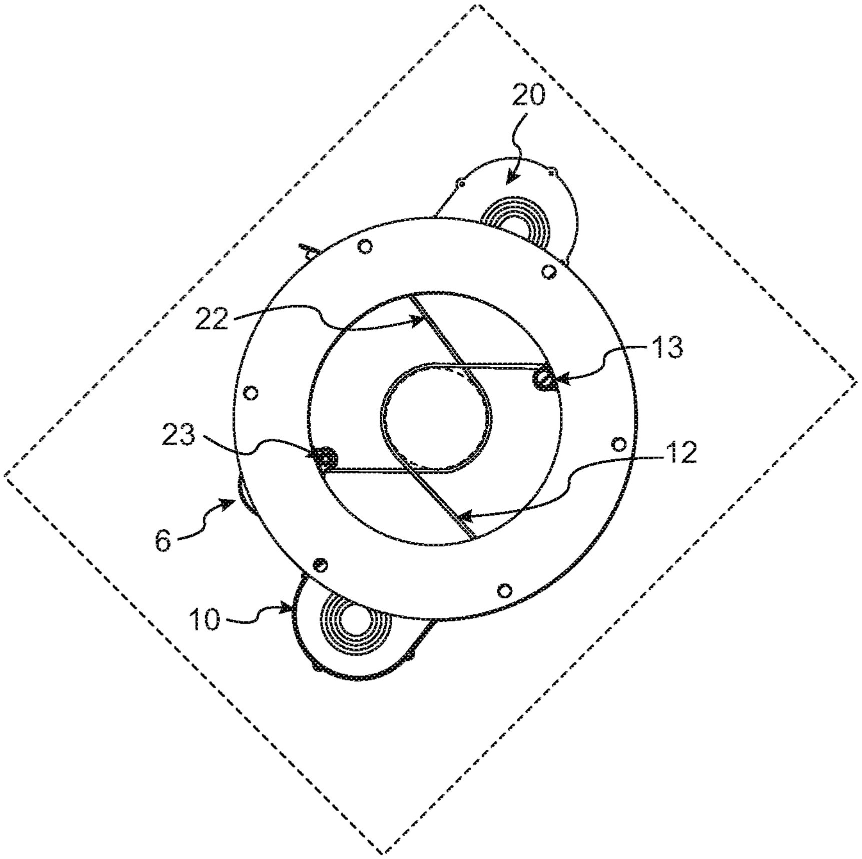
FIG. 9 is a top view of the state illustrated in FIG. 8.
Figure 10:
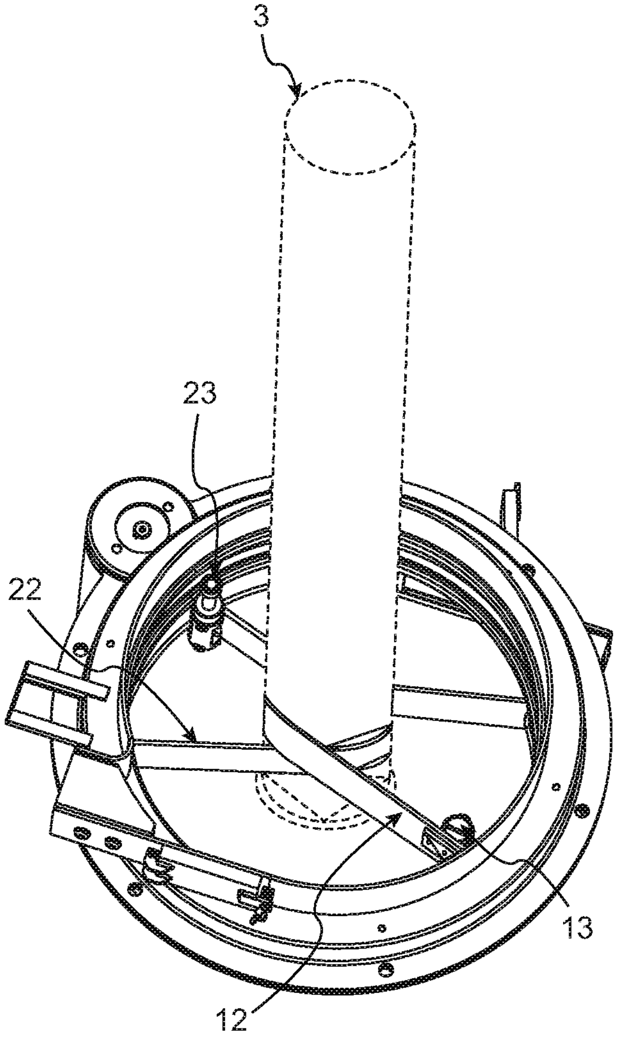
FIG. 10 corresponds to FIG. 3, but illustrates the tool in an activated state, engaging a rod or a tubular element.

FIGS. 8-10 illustrate the tool according to the invention in an activated state. The ring gear 30 has been activated as described above, and the elongate flexible members 12, 22 have been rotated partly around the a rod element or a tubular element 3, and a portion of each elongate flexible member 12, 22 is engaging a respective circumference portion of the element 3. The element 3 may for example be a drill pipe 3. It will be understood that the tool may be dimensioned (for example in relation to the diameter of the element 3, such that the entire circumference is in contact with a portion of a flexible member. The gear 30 may be configured to rotate at least 180°. The tool may also comprise more than two elongate elements, as mentioned above. Although not ideal and not illustrated, the tool may also comprise only one flexible member and associated devices.

In the activated state as illustrated in FIGS. 8-10, the tool 1 may be used as a wiper tool, for example to clean the external surface of a rotating drill pipe 3 which is being pulled from a wellbore. The double-headed arrow in FIG. 8 indicates longitudinal movement of the element 3. During this wiping operation, the interplay between the drive unit 6 and the control units 11, 21 is controlled manually or based on sensed parameters, such as tension in the flexible members, in order to provide a desired force against the element 3. The back-tension may also be provided by or assisted by spring devices.

The elongate flexible members comprise materials that are suitable for the intended wiping operation, and may be belts or bands. It will be understood that the tool may have other applications.

Figure 11:
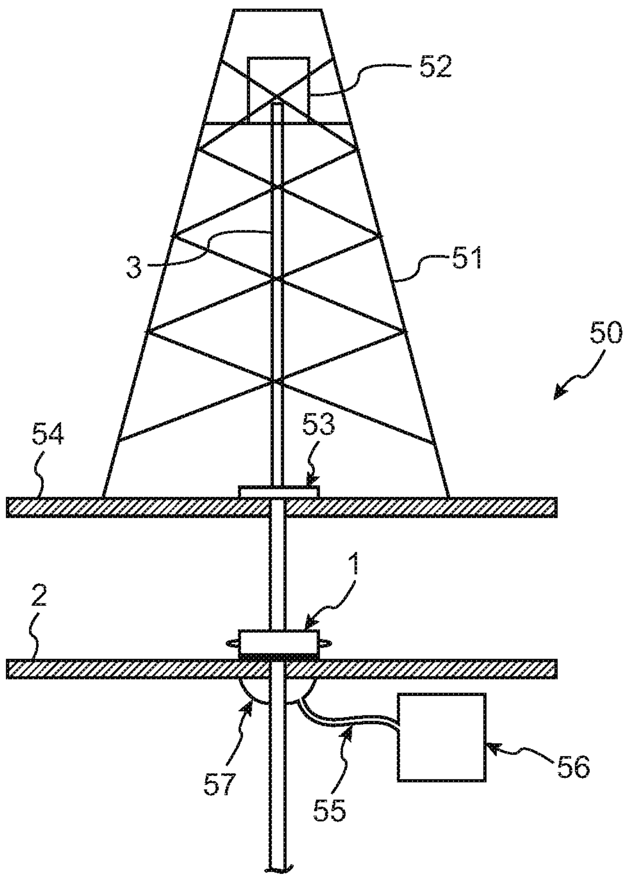
FIG. 11 illustrates the tool according to the invention installed on a deck of a drilling facility.

FIG. 11 illustrates the tool 1 according to the invention installed on a deck 2 of a drilling facility 50. A drill pipe 3 is rotatably supported by a motor (e.g. a top drive) 52 suspended by a derrick 51. During e.g. drilling operations, the drill pipe is rotated by a rotary table 53 on a drill deck 54 or by the top drive. In the illustrated embodiment, the tool (here: a wiper tool) 1 is placed on a deck 2 below the drill deck, for example on top of a diverter (not shown). During drilling operations, the wiper tool 1 is in its unactivated state, as described above, i.e. with the elongate flexible members retracted. Drilling operations are thus not impeded by the tool.

When the drill pipe is pulled from the well, the wiper tool may be activated to deploy the elongate flexible elements, as described above. Substances removed from the drill pipe outer surface by the wiper tool are collected by a collection system 57 which is connected to a tank or container (e.g. a trip tank) 56 via a conduit 55. In this manner, as the wiper tool may be permanently installed and remotely operated, the drill pipe cleaning process may be performed without exposing humans to harmful substances.

A second embodiment of the tool according to the invention will now be described with reference to FIGS. 12-16. Unless otherwise specified, the features and functions described above with reference to the first embodiment shall apply also to this second embodiment. For clarity of illustration, the elongate flexible members 12, 22 are not shown in FIGS. 12-16. Reference number 71 denotes connection members (e.g. bolts) for interconnecting the upper and lower covers 4*a*, 4*b*, and reference number 72 denotes a hatch for access to the feed channel 14.

Figure 12:
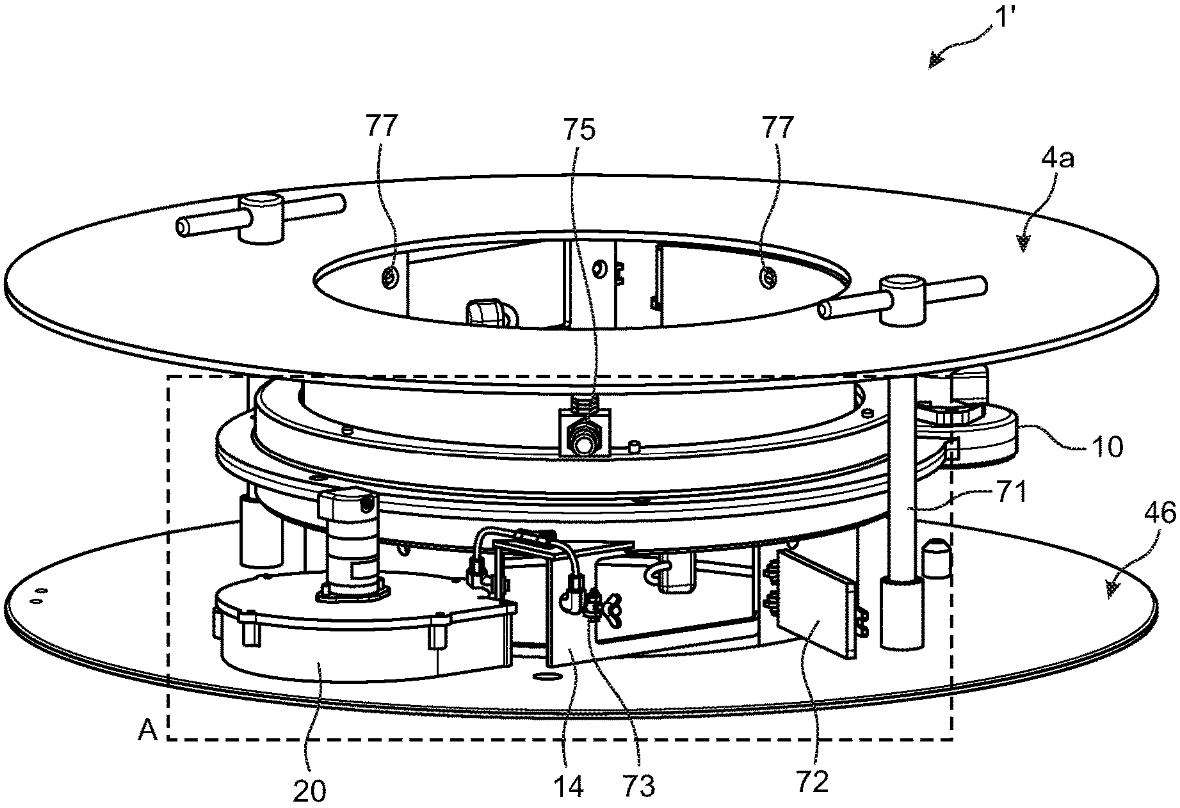
FIG. 12 is a perspective view of a second embodiment of the tool according to the invention (elongate flexible members omitted), illustrating a portion of a flushing system.
Figure 13:
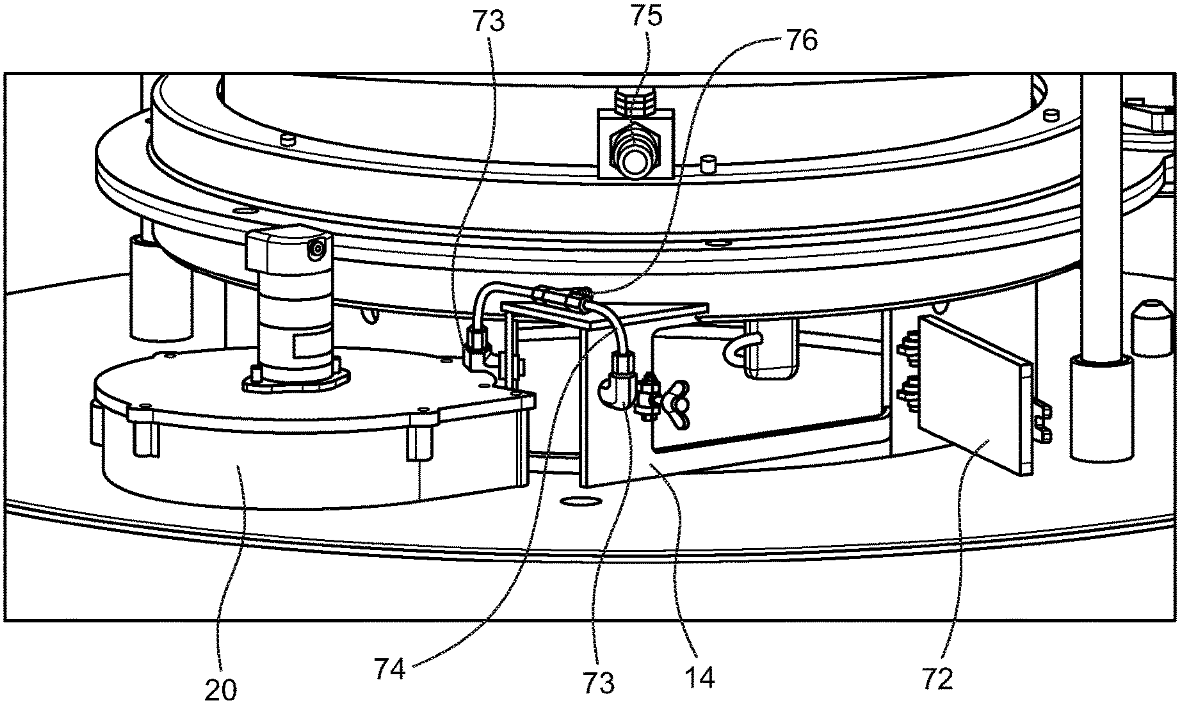
FIG. 13 is an enlarged view of the area “A” in FIG. 12.
Figure 14:
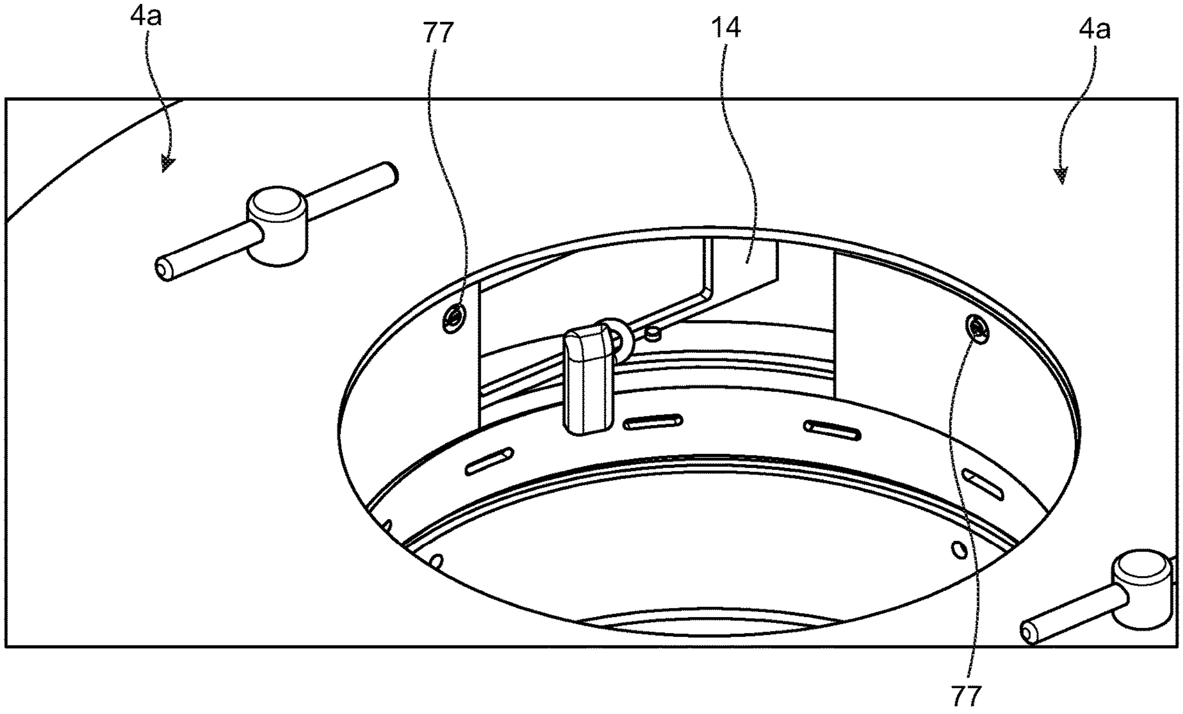
FIG. 14 is a perspective view of a portion of the tool illustrated in FIG. 12, illustrating a portion of an internal flushing system.
Figure 15:
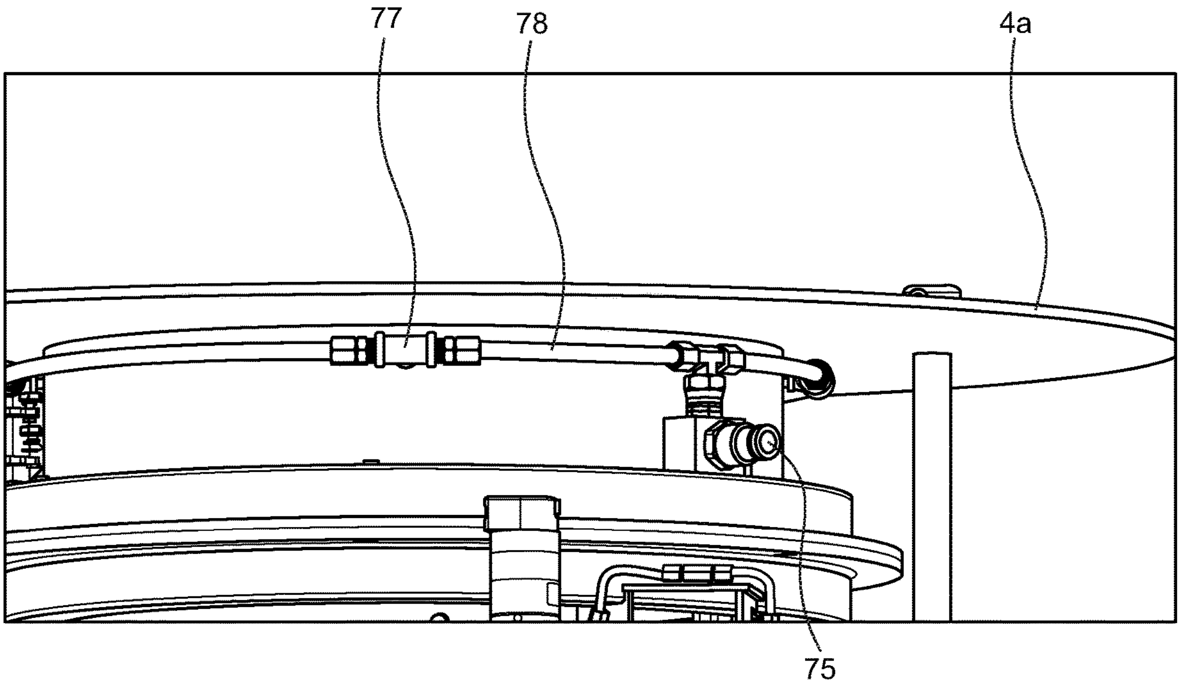
FIG. 15 is another perspective view of a portion of the tool illustrated in FIG. 12.

In this second embodiment, the tool 1' according to the invention comprises a flushing system, comprising a plurality of nozzles 73 external to the opening 9 and a plurality of internal nozzles 77. In the illustrated embodiment, the external nozzles 73 are arranged in pairs, one on each side of the path for the elongate flexible member and pointing towards each other, as illustrated in FIGS. 12 and 13. The pair of external nozzles 73 may thus be operated to spray a pressurized cleaning fluid (e.g. water) onto each side of the elongate flexible member as it passes between the nozzles (e.g. when being retracted into the compartment 20). In will be understood that a similar pair of external nozzles may be arranged in relation to the upper compartment 10. The external nozzles are connected to a pressurized water supply system (not shown) by fluid lines 74 and fittings 76.

Internal nozzles 77 are arranged around an inner wall of the opening 9, and configured and arranged for spraying water towards the center of the opening, whereby a drill pipe 3 or other object passing through the tool is cleaned. The internal nozzles 77 may be used to clean objects that cannot be cleaned by the flexible cleaning members 11, 22 (for example a bottom-hole assembly). The illustrated embodiment comprises four nozzles 77 arranged at regular intervals, but the invention is not limited to this quantity or arrangement. The internal nozzles are connected to a pressurized water supply system (not shown) by fluid lines 78 and fittings 75.

Water ejected from the nozzles 73, 77, along with substances removed from the drill pipe, may be collected the above-mentioned collection system 57. Compressors, valves, piping, etc. that are required to operate the nozzles are not illustrated, as such parts are well known in the art. The nozzles 73, 77 may be activated manually, or automatically based on information from sensors (not shown). The internal nozzles 77 may for example be activated manually, while the external nozzles 73 may be activated automatically when the elongate flexible member is being retracted into the compartment.

Figure 16:
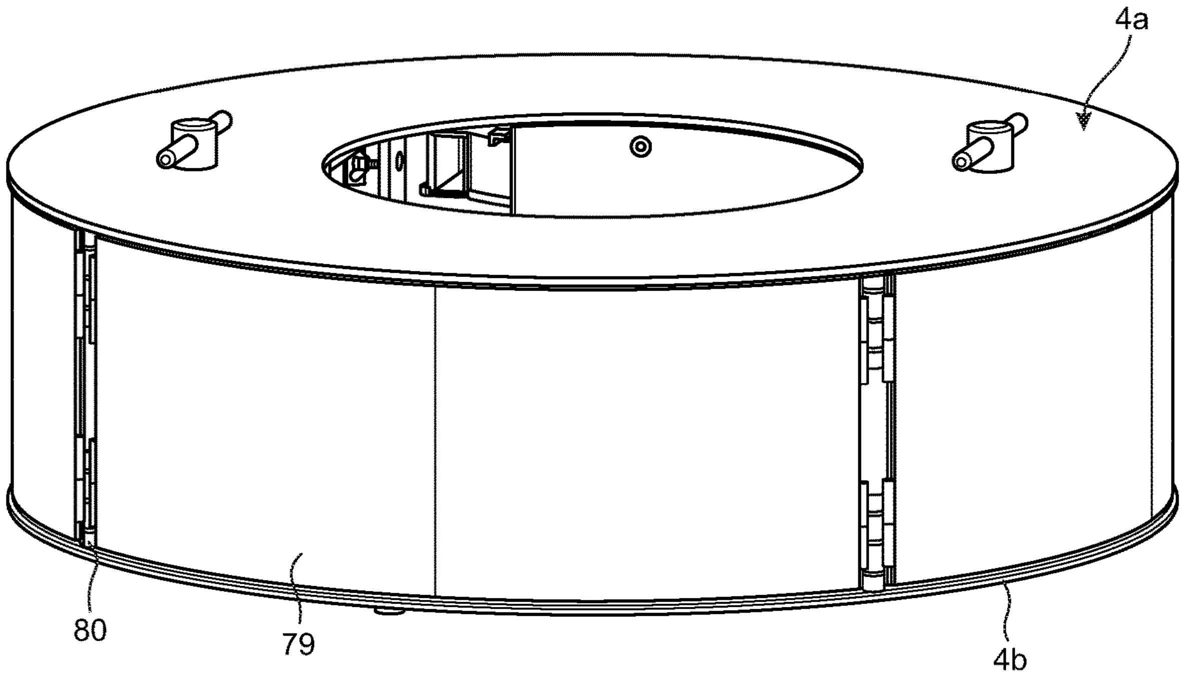
FIG. 16 is a perspective view of the upper and lower covers comprising a circumferential cover (compartments and control units not illustrated).

Referring to FIG. 16, a protective cover 79 is arranged around the circumference of the upper and lower covers, to protect the compartments, control units, and other parts from liquids and debris from the cleaning operations. The protective cover may be of any type, and may extend completely or partially around the circumference. In the illustrated embodiment, the protective cover comprises hinged 80 doors, but the invention shall not be limited to this embodiment.

It should be understood that the first embodiment of the tool according to the invention also may comprise as flushing system as described with reference to FIGS. 12-16.

The invention claimed is:

1. A tool for removing liquids and/or debris from a cylindrical member comprising:

a body having a through-going opening through which the cylindrical member may be extended, and at least one elongated flexible element;

a movable element with an associated drive unit; and at least one control unit, wherein the at least one elongated flexible element, at a first end, is connected to the movable element and, at a second end, is connected to said at least one control unit, wherein the movable element is configured to extend at least a portion of the at least one elongated flexible element into the through-going opening, and wherein the drive unit and the at least one control unit are configured to control a deployment and retraction of the at least one elongated flexible element.

2. The tool of claim 1, further comprising at least a pair of elongated flexible elements, wherein each elongated flexible element is connected to the movable element via respective connection members that are arranged at opposite sides of the through-going opening.

3. The tool of claim 2, wherein the movable element comprises a ring gear drivingly connected to the drive unit, and wherein the connection members are connected to the ring gear at diametrically opposite sides.

4. The tool of claim 1, further comprising compartments configured to house respective elongated flexible elements of the at least one elongated flexible element.

5. The tool of claim 2, wherein at least a pair of connection members are arranged at different and parallel horizontal planes.

6. The tool of claim 3, wherein the ring gear is configured to rotate at least 180°.

7. The tool of claim 1, wherein the at least one control unit comprises or is assisted by springs or automatic retraction devices, whereby an interplay between the drive unit and the at least one control unit is controllable, either manually or based on sensed parameters such as tension in the at least one elongated flexible element.

8. The tool of claim 1, further comprising a plurality of external nozzles configured and arranged to spray a fluid onto at least a portion of the at least one elongated flexible element, wherein the plurality of external nozzles are arranged between the through-going opening and a control unit of the at least one control unit.

9. The tool of claim 1, further comprising a plurality of internal nozzles configured and arranged to spray a fluid into the through-going opening.

10. A method of using the tool according to claim 1 as a wiper tool for wiping substances from an outer wall of a tubular element or a rod element, such as a drill pipe.

11. A drilling facility, comprising:

at least a deck;

devices for handling a drill pipe or a similar tubular element or a rod element; and at least one tool according to claim 1.

12. The drilling facility of claim 11, wherein the least one tool is connected to a deck and is arranged such that the through-going opening is aligned with a deck opening for a drill pipe.

13. The drilling facility of claim 11, wherein the tool is connected to a deck which is below a drilling deck, and wherein a collection system is fluidly connected to the tool and configured to collect substances wiped from the drill pipe by the at least one elongated flexible element.

* * * * *